July 26, 1938.   O. KASPEROWSKI   2,125,027
COMMUTATOR AND LIKE BRUSHES
Filed Sept. 28, 1935   2 Sheets-Sheet 1
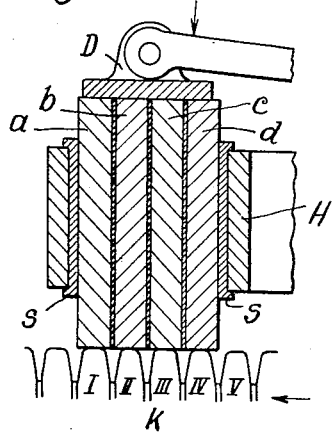
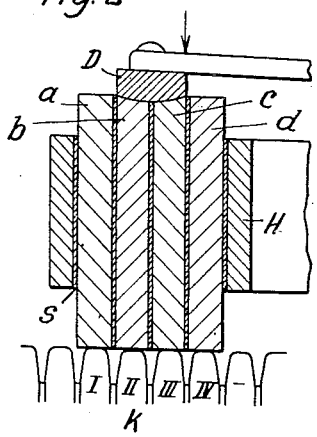
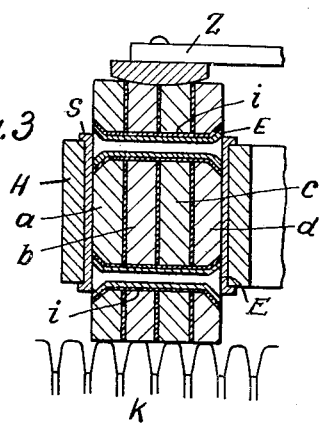
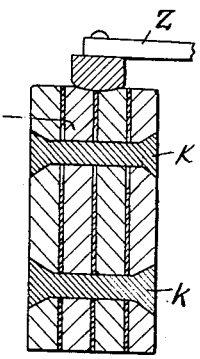
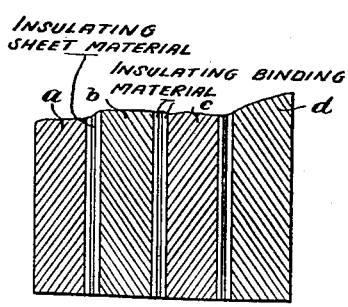
INVENTOR
Ottomar Kasperowski
By Watson, Coit, Morse & Grindle
ATTYS.

July 26, 1938.　　　　O. KASPEROWSKI　　　　2,125,027
COMMUTATOR AND LIKE BRUSHES
Filed Sept. 28, 1935　　　2 Sheets-Sheet 2
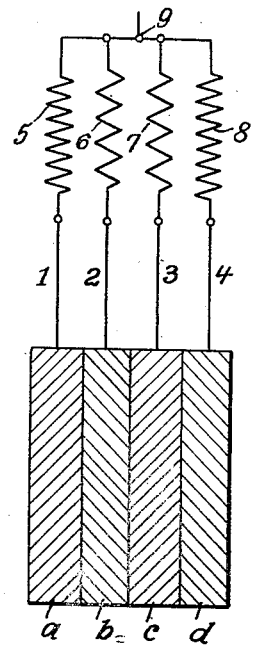
Fig.6
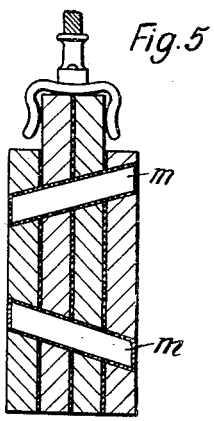
Fig.5
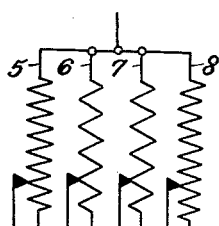
Fig.7
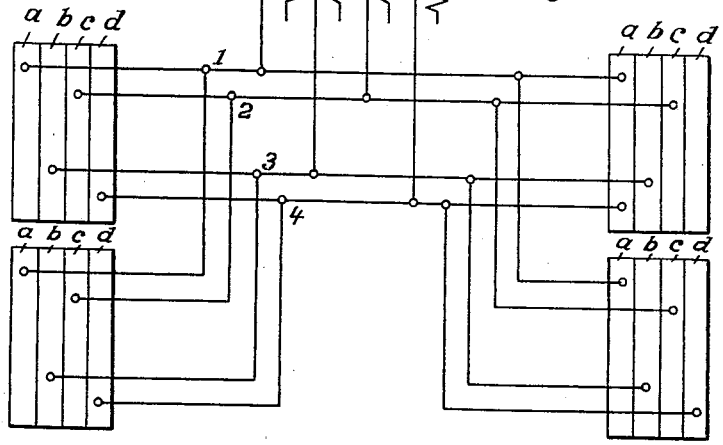
INVENTOR
Ottomar Kasperowski
By Watson, Coit, Moss & Grindle
ATTYS.

Patented July 26, 1938

2,125,027

UNITED STATES PATENT OFFICE 2,125,027

COMMUTATOR AND LIKE BRUSHES

Ottomar Kasperowski, Munich, Germany

Application September 28, 1935, Serial No. 42,680
In Germany December 12, 1932

16 Claims. (Cl. 171—325)

This invention comprises improvements connected with commutator and like brushes and is concerned with laminated carbon and like brushes. Current flowing along a brush is not evenly distributed but may be concentrated at points of the rubbing surface, the result being sparkling and severe burning. Furthermore, a brush may carry cross or short circuit currents between commutator segments, which currents adversely affect the wear of the commutator and brushes, besides causing undue heating and reducing the efficiency and load factor. In addition, such currents are liable to cause flash-over and affect the safety factor of a dynamo electric machine. In the case of motors, such currents reduce the starting torque and place undesirable limits upon the dimensional and electrical design of the machine. In the case of commutator-machines for alternating current, these influences are particularly marked owing to the transformer-voltage of the commutating windings. This consideration imposes the use for alternating-current railways of a frequency as low as possible, in general 16⅔ cycles per second.

Carbons with grooved rubbing surfaces are very inclined to break at the edges and, for other reasons, offer limited advantages only after a long period of running.

Carbon brushes are known consisting of individual layers of carbon which are welded together by intermediate layers of metal or are held together by a binding agent. These constructions however have not proved themselves, partly in mechanical respects and partly because their transverse resistance is too small for producing a satisfactory commutation with machines having a high segment voltage. Various of the known brush constructions have also failed because the adhesive substances used for cementing the carbon laminae have not stood up to the thermal requirements. Consequently the carbon laminae become separated from one another in use.

It is one object of the present invention to provide a brush construction which avoids the defects aforesaid and which reduces short circuit currents under the brushes or permits higher segment voltage at the commutator.

A further object of the invention is to reinforce laminated carbon brushes by bolting, riveting or pinning together the assembled laminae, the heads of such reinforcing means being countersunk so as not to interfere with brush guidance.

Another object is to provide for the manufacture of laminated carbon brushes with insulation layers between the laminae, in such a manner that the strength and electrical properties of the brushes are not impaired by the multiple lamina construction.

Yet another object is to provide for the supply to each brush lamina of a separate working current value, whereby working conditions are improved and the life of the brushes and commutators is increased.

Finally, it is an object of the invention to ensure that laminae connections remain electrically separate under severe vibration and that they do not reduce the strength of the laminated brushes.

These and other objects of the invention and the mode of attaining them will be fully described with reference to the annexed drawings, wherein:—

Figures 1 to 5 are vertical sections of different constructions of laminated commutator brushes in accordance with these improvements.

Fig. 1a is an enlarged fragmentary section through the brush of Fig. 1, and illustrates the nature of the insulation between laminae in all figures.

Figure 6 is a diagrammatic view showing separate current control to each brush lamination.

Figure 7 is a modification of Figure 6.

In Figure 1, the carbon brush consists of separate carbon laminae a b c d firmly cemented together by a heat-resistant adhesive with high electrical insulating powers, for example, artificial resin (Bakelite). The laminae are insulated over their entire length in relation to each other and to the socket of the brush holder, preferably by the use of suitable insertions such as paper layers or oxide layers. Owing to the fact that the thickness of the carbon laminae is less than twice the width of a commutator segment, a carbon lamina does not set up any undesirably high short circuit currents between adjacent commutator segments passing it. There are four laminae in the example shown, but the number may be two or more. The short-circuit current between the outer commutator segments (I and IV) having the highest voltage difference is considerably less than in the case of solid carbon brushes since, with a brush construction in accordance with Fig. 1 and with the armature position illustrated, the current must follow a path through the narrow carbon laminae c and d and through the presser-finger D, and cannot pass directly through the brush.

In this example, the presser-finger D, is sufficiently wide for bridging all the carbon laminae, so that the working current is distributed over the individual insulated carbons a—d. Arcing between the running surface of the carbon and the commutator k, which is concentrated at one edge in the case of solid carbons, is in this example divided between the laminae so as to be less destructive.

Artificial resin has proved suitable as the heat resistant binding agent for connecting the carbon laminae together and at the same time insulating them from one another. The electrical separation of the carbon laminae may be strengthened by a thin paper insulation in the binding layer. Paper, linen, cotton, silk, oxidized aluminium foil and so forth may also be used in the separating layers. Fig. 1a illustrates the manner in which sheets of these materials are embedded in the layers of insulating binding material joining the carbon laminae.

Since the material of the socket h of the holder is generally metal, this, in contact with the carbons a and d, would act as a shunt conductor. In order to avoid the resultant increase of the short circuit current and the consequent strain upon the commutator, there is provided between the holder and the carbon an insulating layer S which may consist of a solid insulating material, a lacquer layer or an oxide layer. This insulation may be firmly connected either to the holder H or to the carbon brush.

Due to the higher short circuit currents, the carbon laminae a, d suffer more considerable burning at the running surface than the carbons b and c. In order to achieve a more uniform wear, the laminae a and d may be made with a higher resistance, so that the greater part of the working current flows through the carbons b and c. The mechanical properties of the outer carbons a and d may also be made different from those of the inner carbon laminae, for example in order to avoid breakage at the edges.

In Fig. 2 the outer carbons a and d are not engaged by the presser-finger D. Consequently they carry no working current and serve only for mechanically strengthening the inner carbons and for improving their running properties. The carbon core through which the working current flows may therefore be made narrower than normal solid carbons so as to short-circuit fewer segments. By sub-dividing the core into insulated carbon laminae, as in Fig. 2, a further improvement is achieved for the thickness of the carbon laminae must in this case also be less than twice the width of a commutator segment. The outer laminae a and d may consist of different carbon-material from the inner laminae having regard to equal wear and for reasons of strength. A layer of insulation S is seen between the brush and holder H.

The strength of short-circuit currents between the commutator segments is dependent to a considerable extent upon the resistance at the places of contact between the carbon and metal. In Figs. 1 and 2, there are, in the short-circuit between the segments I and IV, four copper-carbon contacts, these being between the segment I and carbon a, between a and the presser-finger D, between D and carbon d and finally between d and segment IV. A considerable voltage drop occurs at each of these places of contact and as there are four of them as compared with two only in the case of a solid carbon brush, the resistance to short circuit current flow is greatly increased.

As experiments have shown, the invention permits of the single phase series-motors commonly used for main line working being operated with alternating current of 50 cycles so that the power, which had hitherto to be produced specially for traction purposes with a frequency of 15–25 cycles, can now be taken from the mains of the general supply net-work without conversion. As a result of the invention, alternating current commutator-machines of low frequency and direct current machines may be built with a smaller number of poles and for higher voltages, so that they can be cheaper and lighter. When employing the new carbon brush, the efficiency and load factor are also higher.

Although the above described brushes exhibit excellent strength-properties, they cannot in all cases stand up to the high mechanical stresses occuring in operation and caused, for example, by corrugation of the commutator or by severe vibration of vehicle motors, particularly if the contact, such as D, resting on the carbon brush produces notching.

Accordingly, the mechanical connection between the cemented carbon laminae may be stiffened by several transverse pins, rivets or bolts distributed over the length of the brush and insulated from all the laminae, the heads thereof being countersunk in the outer laminae.

It is known to assemble metal laminae of different electrical conductivity to form a metal brush and to clamp the free ends of the laminae, outside of the brush holder, by means of headed screws and between insulated jaws. Such brushes cannot be used for proper commutator operation. The carbon brushes with which this invention is concerned must be held against deflection and extensively guided for their carbon laminae require a firm support on both sides over the entire length, since otherwise they would spread at the running surface and break away at the holder.

Fig. 3 illustrates an example of transverse pinning for holding together the four carbon laminae a, b, c, d. The example consists of a hollow rivet E. After being introduced into a hole bored through the carbon laminae, it is spread at its ends, the head portions being countersunk in the outer carbon laminae so as not to interfere with the sliding and guidance of the carbon in the holder. The hollow rivet E is surrounded by an insulating sleeve i consisting of paper, artificial resin or some other insulating material.

In Fig. 4 there is a double headed pin k of insulating heat-resistant material, for example phenol-resin, which is cast in the hole and assumes a solid final condition at a certain temperature and after a certain period of drying. This gives a particularly advantageous form of pinning. Since phenol resins are a carbon product they wear approximately equally with the brush.

Fig. 4, by way of example, shows a carbon brush with dummy outer laminae, only the inner carbon laminae being traversed by the working current. Also, the example in Fig. 5 has a similar construction.

In Fig. 5 there is a smooth cylindrical pin m of solid insulating material, for example dried or impregnated wood. This pin is fitted tightly into the hole and cemented therein by means of a heat-resistant and insulating adhesive. The pin m may, if desired, be provided with a head at one end, which may be countersunk in an enlargement of the bore. The pins m are shown inserted at a suitable angle.

As already mentioned, additional intermediate insulating layers may be provided for increasing the insulation between the brush luminae. In order that these additional layers shall not reduce the strength of the brush and that the electrical properties of the insulating materials shall not be impaired by the cementing process, special measures are adopted in the manufacture of the laminated carbon brushes.

Thus, the drying of the carbon brushes cemented by means of artificial resin is effected at quite definite rising temperatures, under rising pressure and for definite periods, a special preparation of the carbon laminae and of the additional insulating materials being also necessary.

The strength of the carbon brushes is increased if the irregularities exhibited by the adhering surfaces are minimized. If the carbon surfaces have a rough surface, then the projecting parts thereof under the high pressing pressures necessary during the drying, may be pressed through the additional insulating layers and thereby short-circuit the carbon laminae. This will happen the more readily, since the additional insulating materials must be as thin as possible for mechanical reasons. In order, therefore, to obtain a mechanically strong brush and good insulation of the carbon laminae, the surfaces of the carbon laminae are ground as smooth as possible. The surfaces of the insulating material and the carbon are, moreover, carefully cleaned to free them from dust and foreign bodies, to prevent the insulating materials from being damaged during the pressing of the brush.

Viscous artificial resin is applied uniformly to the surfaces thus prepared. After the insertion of the insulating material between adjacent carbon laminae and the clamping of the assemblage in a suitable press, for example screw-vices with exactly adjustable pressure, the drying of the brushes is effected in an oven with controllable temperature.

As is known, liquid artificial resin can be converted into a solid final condition by heating. The period required for the conversion is dependent upon the temperature and increases considerably with decreasing temperature. In general, for other purposes, conversion temperatures of from 150° to over 200° C. are usual for artificial resin (Bakelite). The use of as low temperatures as possible has proved to be necessary for the production of the above described carbon brushes. Furthermore, in the first hours of the drying, the temperature may only be increased slowly, in order that the insulating materials may become gradually degasified and that the resultant pores of the insulating material may become filled with artificial resin. This is on account of electrical and mechanical considerations. The upper limit of the drying temperature, after 6 to 8 hours, is about 100° C. If the temperature is increased too rapidly or is made too high, then the layer of artificial resin hardens too rapidly and does not penetrate into the pores of the insulating material. Degasification does not take place to a sufficient extent and the compressed gas residues may later burst the adhesive layer. After degasification has become complete, the temperature may be increased, but not above 130° C. At higher temperatures, which may be permissible in other processes for shortening the drying period, the electrical and mechanical properties of the insulating material, and therefore of the finished brush are impaired.

Apart from the temperatures, the pressures during drying are also of decisive importance. In the first hours, the pressure is not increased beyond two kilogrammes per square centimetre in order that the degasification may take place properly. On the other hand, in order that the artificial resin shall nevertheless penetrate sufficiently into the pores of the insulating material, the pressure at the commencement of the drying should not be reduced below 0.5 kg/cm². After about 2 hours drying, the pressure is gradually increased in such fashion that, after complete degasification of the insulating material, (the carbon and the Bakelite), it amounts to at least 15 kg/cm². As has been determined by experiment, it is not possible with lower pressures to achieve sufficient strength of the finished brushes. The high pressure is maintained until the completion of the drying process.

In order to ensure that the artificial resin assumes a solid condition which is invariable under subsequent warming during operation, but nevertheless has sufficient elasticity, the drying at the highest allowable temperature, after degasification of the insulating material has been effected, is carried on for at least 6 hours. With too short a drying period, the adhesive may become loosened under severe heating during use. Grinding to precise dimensions is effected after slow cooling of the dried brushes.

The manner of supplying the current is an important question in connection with the practical utility of the laminated carbon brushes. Generally the working current is supplied to the brushes by way of a slip-on cap or by way of a presser-member. Hitherto it was known only to supply the working currents to several laminae by way of a common cap or common presser member, the supply to the brush and the connection of the laminae to the brush-head being effected without additional resistance.

In accordance with this invention, each brush lamina has a special electrically separate supply-means for the working current. Furthermore, graduated resistances are included in the supply connections. In this manner both a considerable reduction of the short-circuit currents between the brush laminae and also a better distribution of the current are achieved. Ohmic resistances having inductance may be used as the resistances.

If however the resistances are required for commutator-machines with high segment-voltage, for example for 50 cycle railway motors, they must be comparatively large and, owing to their ohmic component, they then bring with them undesirably high losses. Accordingly, use is made with advantage of resistances of which the ohmic component plays a subordinate part in relation to the inductive component. These commutating chokes also result in saving of weight, since they prove to be comparatively small on account of the known very high frequency of the short-circuit currents to be suppressed. Since the frequency of the short-circuit currents varies with the speed of revolution, the chokes are made adjustable. The adjustment is effected in known manner, for example by switching individual turns of the chokes in or out depending upon the speed of the machine.

By way of example, Fig. 6 illustrates a four-lamina brush with current control for individual laminae. The working current is supplied separately to the brush laminae by way of the leads 1, 2, 3 and 4 insulated from each other. The connection of the leads to the brush laminae is effected in any suitable manner. In series with the leads 1—4 there are additional resistances 5—8 which are connected together at the point 9 where there is the main connection for the brush. The inclusion of the additional resistances 5—8, ensures that the working current is distributed uniformly between the brush laminae. The more uniform distribution of the current brings with it the advantage that the brushes can be more heavily loaded, or that, for a given current, the running surface of the brush and the width of the slip-ring or commutator can be reduced.

For commutator-machines, the brush-connection in accordance with Fig. 6 may be so designed that the resistances 5 and 8 connected to the outer brush laminae are larger or of higher value than the inner resistances 6 and 7. In this fashion, it is possible to ensure that all the brush laminae carry not only equal working currents but also equal short-circuit currents, whereas, in the hitherto common constructions, the outer laminae are more highly loaded. Commutator sparking and brush wear are reduced to the better distribution of the current. Since, moreover, the short-circuit currents are reduced by the additional resistances 5—8, use may be made, even in the case of commutator-machines with a higher segment voltage, of metal-carbon or even metal, instead of carbon, for the brush laminae a—d and consequently the brush can be more highly loaded.

The resistances 5—8 can be fixedly mounted upon the brush holder or rod, whilst the leads 1—4 are movable or flexible braids of low resistance. However, the movable leads 1—4 may also be made of resistance material, so that they are complementary to the resistances 5—8.

Fig. 7 illustrates how each resistance may serve for several brushes connected in parallel. Each resistance is connected in the circuit of several similar brush laminae, for example the resistance 5 is in connection with the laminae a of each of four brushes. The several brushes supplied by way of a common set of resistances may belong to a single set of brushes of a spindle or holder or may be distributed over several brush spindles, or holders connected in parallel.

The resistances 5—8 may be arranged as desired. They may be accommodated within the machine or outside of the machine, accessibility and dissipation of heat being more favourable in the latter case. For the resistances, use is preferably made of a material whereof the resistance increases with increasing current. In this manner it is ensured that the working current, upon sudden overloading of the associated brush laminae, automatically distributes itself more heavily to the laminae best adapted for taking it. Furthermore, for suppressing short-circut currents of high frequency, use may be made of a material of which the resistance increases with increasing frequency.

In the case of alternating current commutator-machines, as is known, high short-circuit currents arise particularly during starting, because the commutator pole is not sufficiently effective at low speeds of revolution. In this operative condition, therefore, high resistances 5—8 are advantageous. The short-circuit currents decrease with increasing speed of the machine and the resistances 5—8 may be reduced, particularly having regard to the undesirable losses in such resistances due to the working current. In order to be able to satisfy these requirements the resistances in Fig. 7 are made adjustable as shown in the conventional way.

I claim:—
1. Commutator or like carbon brush consisting of carbon laminae bonded together by an intermediate layer of heat resisting insulation material incorporating a layer of insulating sheet material.

2. Commutator or like carbon brush comprising carbon laminae bonded together by an intermediate layer of heat resisting insulation material incorporating a layer of insulating sheet material, the bonding being reinforced by insulated transverse pinning.

3. Manufacture of commutator or like carbon brushes comprising assembling carbon laminae with intermediate layers of heat-resisting and non-conducting bonding material incorporating a layer of insulating sheet material, and drying the assemblage under increasing pressure and temperature, the maximum temperature being about 130° C.

4. Manufacture of commutator or like carbon brushes comprising assembling carbon laminae with intermediate layers of heat-resisting and non-conducting bonding material incorporating a layer of insulating sheet material, drying and degasifying the assemblage under increasing pressure and moderate heat, and finally applying pressure and heat not exceeding 130° C.

5. Manufacture of commutator or like carbon brushes comprising assembling carbon laminae with intermediate layers of artificial resin incorporating a layer of insulating sheet material, drying and degasifying the assemblage under increasing pressure and temperature not exceeding 100° C., and finally applying pressure and heat not exceeding 130° C.

6. Manufacture of commutator or like carbon brushes comprising assembling carbon laminae with intermediate layers of heat resisting and non-conducting bonding material incorporating a layer of insulating sheet material, applying increasing pressure to the assemblage but starting with a pressure not exceeding two kilogrammes per square centimetre, and finally applying pressure and heat not exceeding 130° C.

7. Manufacture of commutator or like carbon brushes comprising assembling carbon laminae with intermediate layers of heat resisting and non-conducting bonding material incorporating a layer of insulating sheet material, drying and degasifying the assemblage under increasing pressure and heat starting with a pressure not exceeding two kilogrammes per square centimetre and finishing with a temperature not exceeding 100° C., and finally pressing and heating the assemblage to a pressure not exceeding fifteen kilogrammes per square centimetre and to a temperature not exceeding 130° C.

8. Manufacture of commutator or like carbon brushes comprising grinding smooth and cleaning carbon laminae of appropriate dimensions, assembling such laminae with intermediate layers of an insulating bonding agent incorporating a layer of insulating sheet material, and degasifying, drying, and finally finishing the assemblage by the application of limited increasing pressure and temperature.

9. Brush gear comprising a laminated brush having its laminations insulated from one another by intervening layers of heat resistant binding material incorporating a layer of insulating sheet material, separate current leads between individual laminations and the appropriate terminal, and resistance means in said leads.

10. Brush gear comprising laminated brushes in which the laminations are insulated from one another by intervening layers of heat resistant binding material incorporating a layer of insulating sheet material, separate current leads between individual laminations and the appropriate terminal and resistance means in leads paralleling corresponding laminations of different brushes.

11. Brush gear comprising a laminated brush having its laminations insulated from one another by intervening layers of heat resistant binding material incorporating a layer of insulating sheet material, separate current leads between individual laminations and the appropriate terminal, and variable resistance means in said leads.

12. Commutator or like carbon brush consisting of carbon laminae bonded together by an intermediate firmly adhering temperature resistant insulation layer incorporating a very thin sheet of oxidized metal.

13. Commutator or like carbon brush consisting of carbon laminae bonded together by an intermediate layer of artificial resin, said layer incorporating a sheet of material presenting interstices for the entry of such resin.

14. Commutator or like carbon brush consisting of carbon laminae bonded together by an intermediate layer of heat resistant binding material, said layer incorporating a sheet of material presenting interstices for the entry of such material.

15. Commutator or like carbon brush consisting of carbon laminae bonded together by an intermediate layer of artificial resin incorporating a layer of insulating sheet material, the bonding being reinforced by insulated transverse pinning.

16. Manufacture of commutator or like carbon brushes comprising assembling carbon laminae with intermediate layers of heat-resisting and non-conducting bonding material incorporating a layer of insulating sheet material, drying and degasifying the assemblage under limited pressure and temperature for a period of at least six hours, and finally applying increased pressure and temperature not exceeding 190° C.

OTTOMAR KASPEROWSKI.